United States Patent
Serafat et al.

(10) Patent No.: US 8,494,509 B2
(45) Date of Patent: Jul. 23, 2013

(54) METHOD OF REMOTELY CHANGING OPERATING CHARACTERISTICS OF A COMMUNICATIONS DEVICE

(75) Inventors: Reza Serafat, Bochum (DE); Jens-Uwe Sohner, Bochum (DE); Hans-Mathias Glatzer, Dortmund (DE); Amir Imam, Bochum (DE)

(73) Assignee: Nokia Corporation, Espoo (FI)

( * ) Notice: Subject to any disclaimer, the term of this patent is extended or adjusted under 35 U.S.C. 154(b) by 97 days.

(21) Appl. No.: 12/228,513

(22) Filed: Aug. 12, 2008

(65) Prior Publication Data

US 2008/0310610 A1     Dec. 18, 2008

Related U.S. Application Data

(63) Continuation of application No. 10/512,884, filed on Oct. 27, 2004.

(51) Int. Cl.
*H04Q 7/14* (2006.01)
*H04M 3/42* (2006.01)

(52) U.S. Cl.
USPC ............... 455/419; 455/420; 379/201.01

(58) Field of Classification Search
USPC ..................... 379/201.01; 455/419
See application file for complete search history.

(56) References Cited

U.S. PATENT DOCUMENTS

| | | | |
|---|---|---|---|
| 5,479,476 A * | 12/1995 | Finke-Anlauff | 455/566 |
| 5,898,783 A | 4/1999 | Rohrbach | |
| 6,351,639 B1 * | 2/2002 | Motohashi | 455/420 |
| 6,606,504 B1 | 8/2003 | Mooney et al. | |
| 6,662,023 B1 | 12/2003 | Helle | |
| 6,993,329 B2 | 1/2006 | Cho et al. | |
| 7,076,255 B2 | 7/2006 | Parupudi et al. | |
| 2002/0037714 A1 | 3/2002 | Takae et al. | |
| 2002/0044149 A1 | 4/2002 | McCarthy et al. | |
| 2003/0104790 A1 * | 6/2003 | Ylitalo | 455/90 |
| 2003/0149867 A1 * | 8/2003 | Park et al. | 713/1 |
| 2003/0216134 A1 | 11/2003 | Mutoh | |
| 2005/0125718 A1 * | 6/2005 | Van Doorn | 715/513 |

FOREIGN PATENT DOCUMENTS

| | | |
|---|---|---|
| DE | 10023474 | 11/2001 |
| WO | WO 0128221 | 4/2001 |

* cited by examiner

*Primary Examiner* — Rasha Al Aubaidi
(74) *Attorney, Agent, or Firm* — Ditthavong Mori & Steiner, P.C.

(57) ABSTRACT

The present invention relates to a method of remotely changing operating characteristics of a communications device selected for signaling an incoming message or call to a user. To allow signaling an urgent incoming message or call to a user even if the device to be called is in a mute state, the method comprises the steps of: transmitting control data from a calling device (MS1) to a device (MS2) to called; changing a group of operating characteristics of the device (MS2) to be called in accordance with the transmitted control data; and signaling an incoming message or call in accordance with the operating characteristics set up in the previous step.

20 Claims, 2 Drawing Sheets

METHOD OF REMOTELY CHANGING OPERATING CHARACTERISTICS OF A COMMUNICATIONS DEVICE

CROSS REFERENCE TO RELATED APPLICATIONS

This application is a continuation of U.S. patent application Ser. No. 10/512,884 filed on Oct. 27, 2004 and claims domestic priority to said application under 35 USC §120. The parent application is a US national phase entry of International Application No. PCT/IB2002/01562 filed on May 8, 2002.

The present invention relates to a method of remotely changing operating characteristics of a communications device.

It is well-known in the art that operating characteristics of a communications device, in particular of a telephone can be selected for signaling an incoming message or call. In particular, almost all today's telephones provide the possibility of adjusting the volume and the timbre or tone color of the ringing tone so that a user of a telephone can choose the quality of the ringing tone.

In addition, as described in EP 0 611 070 A2 the operating characteristics of a mobile telephone such as the volume of an output signal, the volume of the ringing tone, and the generation of tones can be modified so that the mobile telephone can be conveniently used in any environment. In order to facilitate the modification of the plurality of operating characteristics a plurality of profiles or groups are defined for these characteristics. Each profile or group includes predetermined values of all these operating characteristics and the selection of a particular profile or group results in a plurality of operating characteristics being modified simultaneously.

Thus, when moving from one environment to another a user only have to make a single menu selection resulting in a plurality of operating characteristics being modified simultaneously.

EP 1 117 245 A1 discloses a method that enables a calling telephone to choose a ringing indication to be plaid and/or shown at a receiving telephone. For choosing a ringing indication the user of the calling telephone first selects a ringing indication from a data file. Thereafter the user enter the telephone number to place a call to a desired telephone. During building up the connection or circuit from the calling telephone to the called telephone the selected ringing indication is send to the called telephone that is activated in a manner of the ringing indication that was selected by the calling user at his/her telephone.

Further, ringing indication (sound and/or visual) can be predefined by a user in accordance with the class of an incoming call. To remotely choose the ringing indication intended to be used with a specific class of calls the calling user has to assign the call a class when placing a call. Thus, a call class information is send to the telephone to be called and there predefined ringing indication is selected in accordance with the call class information for signaling the incoming call.

Therefore, it is possible for a user of a telephone to select specific ringing indications for specific call classes, for example official calls, private calls, urgent calls, standard calls and the like so that the signaling of the call indicates the call to the telephone user defined the different ringing indications for different call classes.

Furthermore. U.S. Pat. No. 6,297,726 B1 discloses a radio paging receiver that can be operated in two modes. In a first mode the pager activates light and sound alarms for indicating an incoming message regardless of who the caller is. In a second, password select mode, the pager activates the light and sound alarms only for callers who have transmitted a password with there messages to the pager. Therefore, it is possible to discriminate among those callers who have the password transmitted, only activating both the light and sound alarms when pre-selected callers are detected as transmitting a message to the pager. If a message from a caller whose is not selected is received only the light alarm is activated and the message is displayed.

Hence, it is already known to select one of two message signaling modes in dependence on a received password indicating that the calling party is allowed or not to cause a specific priority signaling mode.

In addition, WO 97/32439 discloses a terminal for a communications network, the terminal being capable of supporting a plurality of applications and having means of communicating user messages. In particular, the terminal comprises means for receiving user messages having data and a header relating to one of the applications and means for addressing the data of a received message to a respective application according to the header. The messages that can be communicated by this known terminal are short messages and/or so called smart messages.

Short messages, that are called hereinafter SMS, are messages according to the Short Messaging Service standard. Smart messages are a special kind of SMS the header of which includes information about how to use the information of the data portion. Enhanced messages, that are called hereinafter EMS, are messages according to the Enhanced Messaging Service standard. Multi media messages called hereinafter MMS are messages according to the Multi Media Messaging Service standard.

SUMMARY OF THE INVENTION

The object underlying the present invention is to provide another method of remotely changing operating characteristics of a communications device, that allows signaling an urgent incoming message or call to a user even if the device to be called is in a mute state.

This object is achieved by a method comprising the steps of transmitting control data from a calling device to a device to be called; changing a group of operating characteristics of the device to be called in accordance with the transmitted control data; and signaling an incoming message or call in accordance with the operating characteristics set up in the previous step.

According to the present invention it is possible to change over from one group of operating characteristics to another one to switch a communications device, in particular a mobile telephone e.g. from a mute state to a state in which incoming calls and messages are acoustically signaled to the user. By switching over the complete group of operating characteristics it is possible not only to change the loudness of a ringing tone but the ringing tone itself so that the degree of urgency can be indicated, too, by the ringing tone of the selected group.

In addition, instead of switching to a profile or group of operating characteristics with a loud ringing tone, it is also possible to switch to a profile with low ringing volume if the called party shall not be disturbed unnecessarily.

Furthermore, the method according to the present invention can be used for messages, e.g. facsimile, SMS, MMS, EMS or the like, which are sent to a mobile telephone or station, too. In this case remotely switching to another profile or group of operating characteristics can be used for underlining the importance of the message sent. On the other hand, profile switching can be applied for switching to a profile including a ringing tone that has a low volume or is mute, in case that the recipient shall not be disturbed.

Preferably the control data is transmitted via a signaling channel as a message including at least a header and a data portion. Thus, using the signaling channel facilitates implementing the present invention in communications devices since it is just necessary to implement respective applications in both the calling devices and the devices to be called without any change of the network standards and/or protocols.

According to a preferred refinement of the present invention the control data comprises an indication which application can interpret the included command information.

Advantageously the control data comprises identification data indicating that the calling party is authorized to remotely change operating characteristics of the device to be called.

This feature ensures that only a very selected number of people can be authorized by the user of the communications device to be called to change operating characteristics in cases requiring immediate action or attention.

Preferably, the operating characteristics of the device to be called include remote switching enable/disable data comprising positioning data and/or time data indicating locations and/or time periods where and/or when remote changing of a profile or a group of operating characteristics has to be allowed or not, and changing of the group of operating characteristics of the device to be called according to the transmitted control data is performed only if remote switching is enabled with regard to the actual position and/or time. Thus, the user of a mobile telephone can determine locations and time periods where and when profile changing or switching is prevented. So he/she can decide where, e.g. at home, and when, e.g. at night, he/she does not wish be disturbed by incoming messages or calls.

Specifically, the active group of operating characteristics is changed to a standard group of operating characteristics.

According to another refinement of the present invention the active group of operating characteristics is changed to a group specified in the received control data if available otherwise to a default group. Therefore, it is possible that the people of a private or business group or team agreed to a specific group of operating characteristics provided in their communications devices so that the user of a communications device called can recognize that a person of specific group or team is calling when the incoming call or message is signaled according to the group of operating characteristics that was agreed beforehand by the group instead of being signaled in accordance with the operating characteristics activated by the user.

Additionally the control data includes loudness setting data; and the loudness value of a ringing tone is set to desired value.

For placing a call instead of sending an important message only it is preferred that an acknowledging message is sent back from the device to be called to the calling device. This is to ensure that an urgent call will be acoustically signaled to the user to be called.

According to another development of the present invention it is provided that the active group of operating characteristics is changed back automatically after completing the call or after signaling an incoming call or message to that group of operating characteristics that was active prior to the change of operating characteristics remotely initiated.

Alternatively, the active group of operating characteristics is changed back to said group of operating characteristics that was active prior to the change of operating characteristics remotely initiated upon receiving reset data from the calling device.

According to another aspect of the present invention the method of remotely changing operating characteristics of a communications device comprises the steps of transmitting control data from a calling device to a device to be called; and switching off the called device in accordance with switch off data included in the received control data after checking whether or not switching off has to be allowed by means of checking a password.

This method makes it possible that a communications device can be switched off remotely in case that the device was lost or stolen to prevent unauthorized use of such a communications device.

BRIEF DESCRIPTION OF THE DRAWINGS

The invention will be explained in more detail with reference to the accompanying drawings. In the drawings.

DETAILED DESCRIPTION OF PREFERRED EMBODIMENTS

Figure 1:
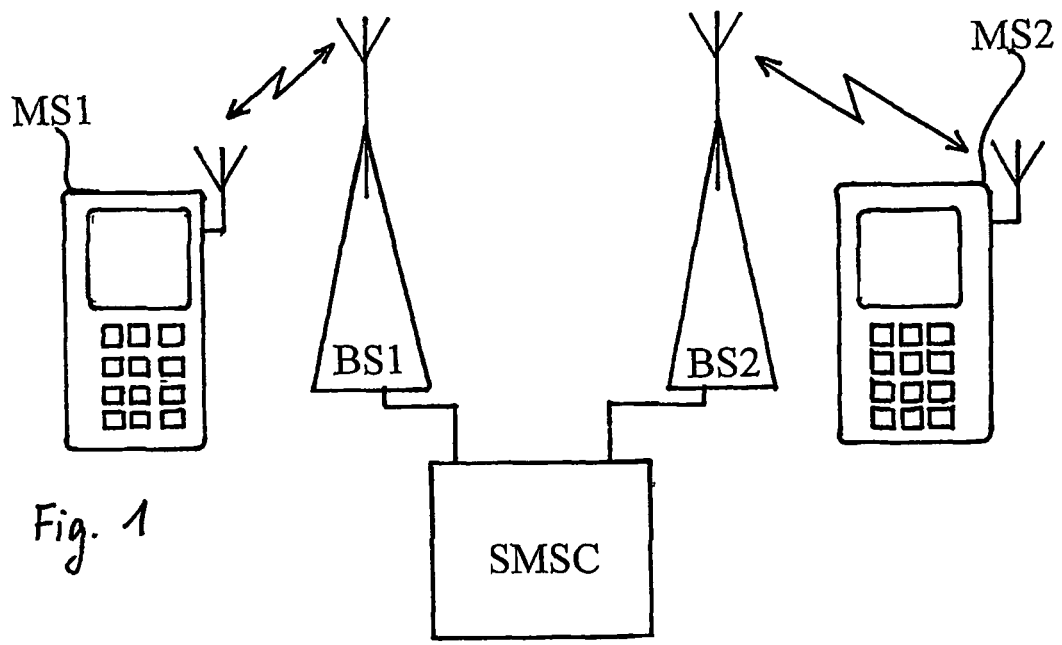
FIG. 1 is a simplified schematic diagram showing a communications system for use with the present invention.

According to FIG. 1 a radio communications network, in particular a radio communications network having a cellular structure comprises a plurality of base stations BS1, BS2, ... each of which is connected with a radio network center comprising a short message service center SMSC for signaling purposes. Further, a plurality of mobile stations MS1, MS2, ... are provided as subscriber terminals of the radio communications network.

Figure 2:
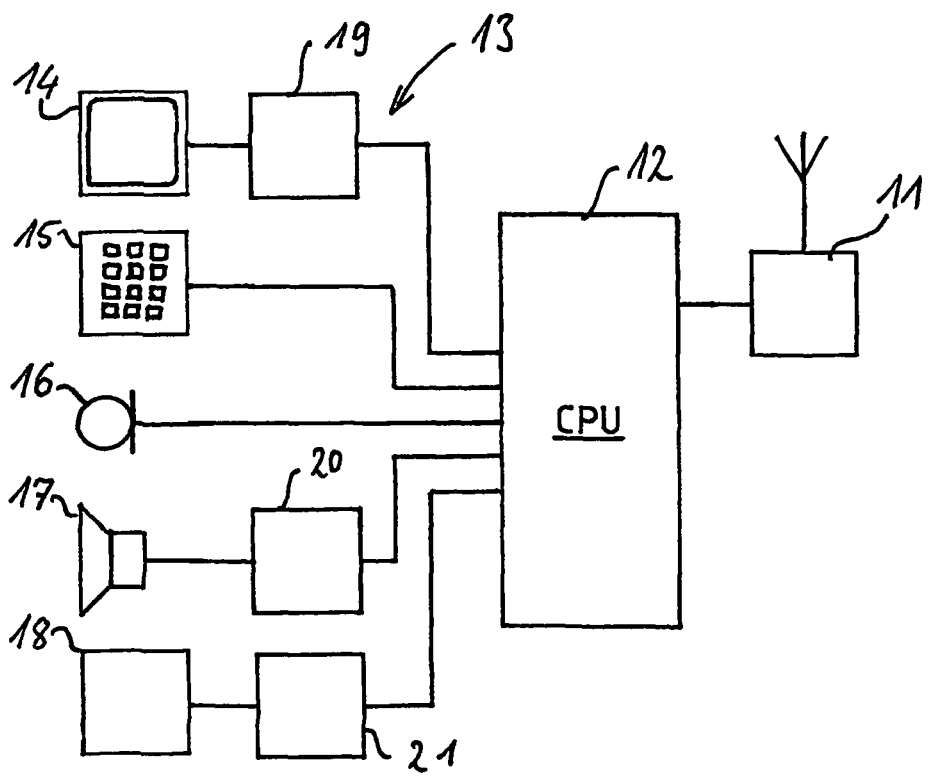
FIG. 2 shows a simplified schematic block diagram of a mobile station.

As shown in FIG. 2 each mobile station MS comprises a RF-portion 11 for receiving/transmitting information via an air interface, a central processing unit (CPU) 12 for controlling the operation of the mobile station, and a user interface 13 having a display 14, a key pad 15, an audio input 16 like a microphone and an audio output 17 like loudspeaker. Further, it is possible that a mobile station MS comprises a vibrating unit 18. For controlling the output means, i.e. for controlling the display 14, the loudspeaker 17 and the vibrating means 18 respective driving means, i.e. a display driver 19, a loudspeaker driver 20 and a vibrating means driver 21 are provided.

To adapt the operating characteristics of a mobile station, in particular the operating characteristics for signaling an incoming message or call to the environment where the mobile stations is actually used it is possible to adjust the different output means 14, 17, 18 by respectively controlling the corresponding drivers 19, 20, 21. Although the drivers 19, 20, 21 are shown as separate circuit elements of the mobile station MS these elements can be also integrated in the central processing 12 unit and/or can be established as software applications.

For placing a call a user of a mobile station usually inputs a phone number or select it from a phone book and actuates a specific key for starting call setup.

After call setup the incoming call is signaled to the called mobile station MS2 via a respective signaling channel that can be used also for transmitting messages like SMS, EMS, MMS or the like. When the called mobile station MS2 recognizes the incoming call it is signaled to the user by using all or some of the different available output means in accordance with the operation characteristics selected for each of the output means. For example the display 14 is flashing, a ringing tone is output via the loudspeaker 19 with a certain loudness and/or the mobile station MS is vibrating due to the operation of the vibrating means 18.

However, in certain environments, i.e. in a conference or a theater the loudspeaker is usually switched off, so that only the display is flashing and/or the vibrating means are vibrating. Further, a call transfer function can be activated so that the call is transferred to an automatic answering center so that the calling party can leave a message for the called party.

If an urgent message should be send to someone owning a mobile station with activated mute profile, i.e. a group of operating characteristics excluding any sound output it is possible that the owner of the mobile station that receives this urgent message will not recognize the incoming message immediately. Further, if an urgent call is received it will be signaled only for a very short time and then transferred to a call answering center.

However, according to the present invention it is possible that the calling party sends a message, for example an SMS, a so called smart message, an EMS or an MMS, including control data for changing the group of operating characteristics, i.e. the activated profile, to switch the active profile into a general or specific profile. In addition, the control data may include not only data for switching the active profile into a general or specific profile but also for setting the sound volume to a specific high value, for example to ⅘ of the maximum volume or louder and/or the ringing tone to maximum ringing.

Thus, according to the present invention it is possible to switch the active profile of a mobile station remotely for urgent cases. Therefore, members of a predefined group or team could signaling or calling each other by using remote profile switching. Further, the inventive method can be used to find a displaced phone which is in a mute state since it can be remotely switched over in a loud state prior to calling it. Further, the importance of a message or a call can be stressed by using the standard or specific profile instead of the active profile in particular instead of the mute profile. Further, to prevent misuse of the inventive method it is preferred that the message sent from the calling mobile station to the called mobile station includes a security password that is checked after receiving the message but prior to performing profile switching. Therefore, only the messages including such a password will be executed automatically, so that only authorized persons, who know the password could switch the active profile of the receiving mobile station. In this way members of one team could agree on one common password so that in urgent cases a team member can send or broadcast a message including control data, for example an extended smart message to other team members to draw their attention to the urgent case happened.

Furthermore, according to the present invention it is provided that each mobile station can handle several passwords so that the owner of the mobile station who could belong to different teams or groups can be reached by all team members of teams even if each team agreed on having its own password without considering the password of other groups. In this case it is also possible for a user to select one or more or all of the passwords to restrict the number of persons who are allowed to disturb him in urgent cases.

Furthermore, the operating characteristics of the device (MS2) to be called includes remote switching enable/disable data comprising positioning data and/or time data indicating locations and/or time periods where and/or when remote changing of a profile or a group of operating characteristics has to be allowed or not. Therefore it is possible for a user to select locations, e.g. at home, and/or time periods, e.g. at night, where and when she/he does not want to be disturbed. On the other hand, such positioning data and/or time data can be used to define positively when and where she/he will be available for her/his team colleagues and/or friends in urgent cases. Consequently, in case that remote switching enable/disable data are set by the user, the actual position data and/or time data are compared with the data set and changing of the profile or the group of operating characteristics of the device (MS2) to be called according to the transmitted control data is performed only if remote switching is enabled with regard to position and/or time.

The position of the mobile station can be determined by several methods well known in the art. In case that the mobile station is equipped with a GPS (Global Positioning System) module the data received by this module can be used. However, if no such module is available the information about the actual cell of a cellular system where the mobile station is currently located can be used. Furthermore, one of the known cellular positioning methods such as the E-OTD (Enhanced Observed Time Difference) method can be used as an alternative to the methods mentioned before.

Figure 3:
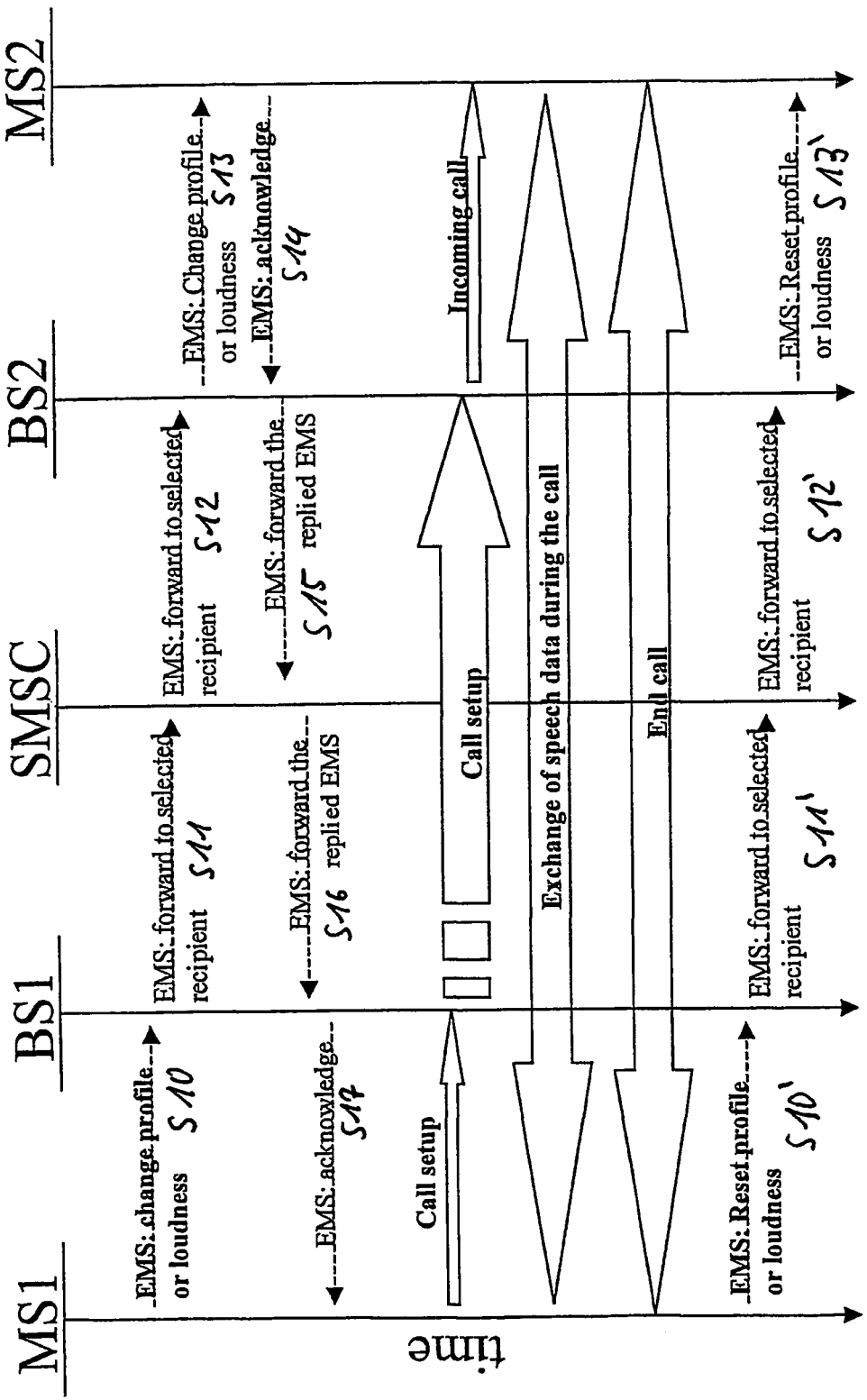
FIG. 3 is a simplified block diagram illustrating remotely changing operating characteristics during placing a call.

The inventive method will now be explained in more detail with reference to FIG. 3.

In case that the user of a first mobile station MS1 wants to call the user of another mobile station MS2 for an urgent case a first message, for example an EMS including control data for changing the profile is send from the mobile station MS1 to a first base station BS1 in step S10. The EMS is then forwarded from the base station BS1 to a short message service center SMSC in step S11. The short message service center sends in step S12 the EMS to that base station BS2 near which the called mobile station MS2 is located. After receiving the EMS forwarded by the second base station BS2 in step S13 the password is checked in the called mobile station MS2 and in case that it is valid profile change is performed in accordance with the control data included in the EMS. After changing the group of operating characteristics of the mobile station MS2 for signaling an incoming call, the mobile station MS2 trans-mits in step S14 another message that acknowledges the receipt of the first EMS. This acknowledging message is then successively forwarded by the base station BS2 (step S15), the short message service center SMSC (step S16) and the first base station (step S17) to the calling mobile station MS1. It is also possible to use a message according to another standard instead of EMS.

Thereafter, a call setup request is send to the base station BS1 that performs together with the radio network center and the second base station BS2 call setup so that the incoming call is signaled to the called mobile station MS2 in the usual way. After receiving the information indicating an incoming call the mobile station MS2 signals the incoming call to its user in accordance with the operation characteristics set due to the previously received control data. After accepting the call exchange of speech data during the call and completing the call is performed in the usual way.

At last, after completing the call another EMS is send from the calling mobile station MS1 to called mobile station MS2 in the same way as the first message for resetting that profile of the mobile station MS2 that was active before the first profile change. However, in this case no acknowledging message sent back from mobile station MS2 to mobile station MS1 is necessary.

Please note that the call setup request is sent from the calling mobile station MS1 only after receiving the acknowledging message EMS in step S17. In this way it is ensured that the called mobile station MS2 is able to indicate an incoming call in the desired way to a user of the second mobile station MS2.

The inventive method of remotely changing operating characteristics of a communications device is integrated into such communication devices, in particular, in mobile stations or mobile phones as a specific application. This application includes a dialog oriented user interface operation to guide the user through several steps. It is based on two main parts, i.e. a password data base management and a profile (group of operating characteristics) or state changing. The latter one comprises the possibility of switching off the mobile station, of remotely changing profile and/or loudness and initiating a call and resetting the profile or loudness.

In more detail, the password data base management allows the user to safe a new password for profile exchange, i.e. remotely changing operating characteristics of another mobile station, and to delete and/or to add an existing password. Each password entry is based on two elements, i.e. the password itself and a nickname or identifier to identify the password (e.g. my project).

Upon activating the password data base management, the user win be asked to select one of menu entries, e.g. NEW, EDIT or DELETE. After selecting NEW, the user will be asked to enter a nickname and a password. After selecting DELETE, the user will be asked to mark the password entry to be deleted by using arrow or scrolling keys or the like. After selecting EDIT the user will be asked to select the password entry to be edit. Thereafter the user can edit the password and the corresponding nickname.

After activating the second main part, i.e. profile/state changing the user will be asked to enter a phone number or to search for one in an integrated phone book of the mobile station. Thereafter, the user will be asked to enter the corresponding password or to select a password out of the passwords available in a corresponding password data base. This procedure can be directly linked with the password management part so that the password entries can be read and presented as a list to the user so that she can select a desired password from such a list using the corresponding nickname for identifying the searched password.

After identifying a specific mobile station by entering a telephone number and after inputting a corresponding password the user will be asked to enter one of the following commands: SWITCH-OFF, PROFILE_XXX and LOUDNESS_X. XXX can be modified by the user to specify the name of a desired profile so that it is not necessary to automatically switch over to the standard group of operating characteristics but to a specific group. X indicates the loudness level of the ringing tone.

Thereafter the application sends a specific message including the password and the desired command to the called mobile station MS2 as described above.

Sending the desired level of loudness in addition to the profile name is beneficial for the case that the desired profile is not available on the remote mobile device, i.e. on the called mobile station.

For ease of applying the inventive method the header part of the message, i.e. an SMS, a smart message, an EMS or an MMS, includes information to indicated that this message can be interpreted by the profile switching application which should be available on the remote device so that the received message is automatically forwarded to the profile switching application.

Availability of this profile switching application that is working according to the inventive method is assumed in the following.

On the receiving side the profile switching application reads the incoming message and interprets its content and reacts as follows. If the password is correct the received command is allowed to be executed. Therefore, the mobile station is turned off immediately if the received command is SWITCH-OFF. This feature is convenient for cases where the mobile station got lost or was stolen so that it can not be used by unauthorized person. In case that the received command is PROFILE_XXX the mobile station MS2 is switched to the desired profile if available otherwise it is switched to the profile general or standard. According to the received signal LOUDNESS_X the loudness level of a ringing tone is turned to X. In addition, in the second and third case an acknowledgment is sent to the mobile station MS1 requesting remote profile switching.

In the first case the profile switching application of the calling mobile station MS1 waits on the acknowledgment of the remote mobile station, i.e. the called mobile station. However, in case that the acknowledgment message is not received within a reasonable predefined time slot (e.g. 1 minute) the application initiates the call.

After finishing the call in case that a call could be established, the application sends a message dedicated to the profile switch application of the remote mobile station MS2 to reset its profile to the original one as mentioned above.

The invention claimed is:

1. A communication device comprising:
  a processor configured to store one or more operating profiles for the communication device, one or more of the operating profiles controlling a plurality of operating characteristics;
  a processor configured to enable a detection of a profile change control message, the processor being further configured to determine if the profile change control message is authorized;
  a processor configured to automatically enable a simultaneous modification of one or more of the operating characteristics in an original operating profile of the device to a new profile specified in the profile control message upon determining that the profile control change message is authorized and enable a sending of an acknowledgement message of the new operating profile;
  a processor configured to enable a detection of an incoming call associated with the profile change control message and provide a call notification in accordance with the new operating profile;
  a processor configured to enable a detection of a profile reset message when the incoming call is complete and reset the new operating profile to the original operating profile.

2. The communication device of claim 1 wherein the operating profile controls more than one of a display of the device, a ringing tone of the device, a vibrating of the device, a loudness of the device, or a call transfer function of the device.

3. The communication device of claim 1 wherein the profile change control message, profile reset message, and the acknowledgement message are short message service messages.

4. The communication device of claim 1 wherein the processor for enabling a modification of the original profile is also configured to separately adjust a sound volume of the device to a level specified in the profile change control message.

5. The communication device of claim 1 wherein the processor for enabling a modification of the original profile is further configured to automatically reset the modified profile to the original profile when it is detected that the incoming call is ended.

6. The communication device of claim 1 wherein the profile change control message is further configured to change a state of the device from on to off.

7. The communication device of claim 1 wherein the processor for enabling the modification of the original profile is configured to modify the original profile prior to the device receiving the incoming call associated with the profile change control message.

8. The communication device of claim 1 wherein the processor for determining that the profile control change message is authorized is further configured to compare a current time and positioning data of the device to a set of predetermined time and position data and enable a profile change only at an allowed time and position.

9. A communication device comprising:
  a user interface configured to allow a creation of a profile control change message;
  a processor configured to enable a transmission of the profile control change message to another device;
  a processor configured to enable a detection of an acknowledgement message from the another device indicating a simultaneous change in one or more operating characteristics in an operating profile of the another device to a modified operating profile designated in the profile control change message;
  a processor configured to enable a call from the device to the another device; and
  a processor configured to enable a transmission of a profile reset message to the another device when the call is ended, to cause the another device to return the modified operating profile to an original profile.

10. The communication device of claim 9 wherein the profile change control message simultaneously controls more than one of a display of the device, a ringing tone of the device, a vibrating of the device, a loudness of the device, or a call transfer function of the device.

11. The communication device of claim 9 wherein the profile change control message comprises instructions for changing an operating profile of the another device and instructions for adjusting a sound control of the another device.

12. The communication device of claim 11 wherein the profile change control message also comprises a profile change authorization code.

13. A method comprising:
  detecting a profile change control message in a communication device;
  determining if the profile change control message is authorized;
  automatically simultaneously modifying one or more operating characteristics in an original operating profile of the device to a new profile specified in the profile change control message upon determining that the profile control change message is authorized;
  sending an acknowledgement message of the modified operating profile;
  detecting an incoming call associated with the profile change control message;
  providing a call notification in accordance with the modified operating profile;
  detecting a profile reset message when the incoming call is complete; and
  resetting the modified operating profile to the original operating profile.

14. The method of claim 13 wherein the profile change control message controls more than one of a display of the device, a ringing tone of the device, a vibrating of the device, a loudness of the device, or a call transfer function of the device.

15. The method of claim 13 wherein the profile change control message, profile reset message, and the acknowledgement message are short message service messages.

16. The method of claim 13 wherein detecting a sound volume control message in the profile change control message and adjusting a sound volume of the device to a level specified in the sound volume control message.

17. The method of claim 13 further comprising automatically resetting the modified profile to the original profile when it is detected that the incoming call is ended.

18. The method of claim 13 further comprising changing a state of the device from on to off in response to the profile change control message.

19. The method of claim 13 further comprising modifying the original profile prior to the device receiving the incoming call associated with the profile change control message.

20. The method of claim 13 wherein determining that the profile control change message is authorized further comprises comparing a current time and positioning data of the device to a set of predetermined time and position data and enabling a profile change only at an allowed time and position.

* * * * *